United States Patent [19]
Johansson et al.

[11] Patent Number: 5,636,445
[45] Date of Patent: Jun. 10, 1997

[54] METHOD AND DEVICE FOR CHECKING SYMMETRY

[75] Inventors: Håkan Johansson; Lars Nilsson, both of Åtvidaberg, Sweden

[73] Assignee: JNE AB, Sweden

[21] Appl. No.: 418,010

[22] Filed: Apr. 6, 1995

[30] Foreign Application Priority Data

Apr. 11, 1994 [SE] Sweden .................... 9401192

[51] Int. Cl.$^6$ .................... G01B 11/03; G01B 5/004
[52] U.S. Cl. .................... 33/288; 33/608
[58] Field of Search .................... 33/288, 608, DIG. 21

[56] References Cited

U.S. PATENT DOCUMENTS

| | | | |
|---|---|---|---|
| 4,330,945 | 5/1982 | Eck | 33/288 |
| 4,490,918 | 1/1985 | Clausen | 33/288 |
| 4,513,508 | 4/1985 | Jarman et al. | 33/288 |
| 4,578,870 | 4/1986 | Cooke | 33/288 |
| 4,598,481 | 7/1986 | Donahue | 33/288 |
| 4,630,379 | 12/1986 | Wickmann et al. | 33/288 |
| 4,691,443 | 9/1987 | Hamilton et al. | 33/288 |
| 5,029,397 | 7/1991 | Palombi | 33/288 |
| 5,207,002 | 5/1993 | Humblet | 33/288 |

FOREIGN PATENT DOCUMENTS

| | | |
|---|---|---|
| 0215540 | 3/1987 | European Pat. Off. . |
| 1006801 | 12/1994 | European Pat. Off. . |
| 7302067-9 | 11/1975 | Germany . |
| 3209582 | 9/1983 | Germany . |

OTHER PUBLICATIONS

Car–O–Liner M234 HMP, Car–O–Liner High Measuring Point Accessory, Technical Specification: Art. No. 1331210000; company brochure Date Unknown.
9000 DriveOn Dataliner; company brochure Date Unknown.
3000 DriveOn Dataliner; company brochure Date Unknown.
Car–O–Liner Benchrack "Le Systeme de Controle et de Redressage tous Vehicules VL–4×4 et Utilitaires Legers" company brochure Date Unknown.
Uno Liner; "The Measuring System"; A Fully Equipped Uno Liner; company brochure Date Unknown.
"Wedge Clamp System" pp. 4, 7, 13, 16, and 18; brochure Date Unknown.
XP Measuring system by Duz–Mor;"Precision Measuring" Duz–Mor, Inc. company brochure Date Unknown.
"Ultra–Spec 2000" Kar Grabber; Grabber Manufacturing Co., Inc. company brochure Date Unknown.

Primary Examiner—Christopher W. Fulton
Attorney, Agent, or Firm—Hayes, Soloway, Hennessey, Grossman & Hage, P.C.

[57] ABSTRACT

A method for the measuring of symmetry when in particular repairing cars including the use of a measurement bar comprising in each end a laser head that can be swiveled around the length axis of the bar. The laser heads can emit light beams perpendicular to the length axis of the bar. The bar is on a straightening bench (on which the car is mounted) mounted perpendicular to the length axis of the car. When the laser heads are swiveled their beams construct parallel planes on each side of the car from which measures can be taken to the sides of the car in order to establish if symmetry exist or how great the necessary correction has to be.

2 Claims, 2 Drawing Sheets

METHOD AND DEVICE FOR CHECKING SYMMETRY

BACKGROUND OF THE INVENTION

When repairing panel damages on cars, and in particular damage resulting from collisions, it is important for the correct mounting of new parts as well as for the straightening of deformed parts that this be done so that correct final measurements are achieved. If this is not done the new panel parts will not fit well and the car may become skewed or unsymmetrical after the repair work.

In order to solve these problems it is known to mount in a frame, having in the shape of an inverted U, that part of the vehicle that is to be repaired. Measuring can than be done from opposite sides of the car to the vertical legs of the frame. Then if one side is damaged the opposite side can be straightened and new parts mounted symmetrical by measuring from the frame to both sides of the car body. This is particularly time consuming work. Not only does the man carrying out the repairs have to walk from side to side to make measurements but also usually the measuring frame will be in the way of the work itself. This is particularly the case if the work includes the straightening of the supporting parts of the car body when powerful pulling means must be arranged for pulling out the body of the car in order to pull out parts that have been pushed in in the collision. Since the measuring can not take place simultaneously with the straightening, the apparatus used for straightening must be demounted or removed in some way before the measuring frame is re-mounted and measuring can take place. Likewise the measuring frame has to be removed between straightening steps. Also the frame has to be moved repeatedly along the car body for measurements at different locations. In most cases this time consuming multi step method must be repeated a great number of times until correct positions are obtained. Furthermore the measuring frame requires, in order to function properly, an exactly centered mounting and a mounting such that its vertical legs are really vertical. Furthermore, of course the frame must be placed so that its plane is perpendicular to the length axis of the vehicle. This is normally achieved by mounting the measuring frame on a second frame that in turn is mounted to a so called straightening frame or bench on which the car is normally fixed during the repair work.

The repeated mounting and demounting of the measuring frame will wear on the fastening brackets increasing the risk of faulty mounting positions. The measuring frame, has to be light and slender to be possible to handle, and may also be easily bent or otherwise damaged in handling. Also there is the risk that the frame, when handled can damage the car body.

In view of the above problems there exist a need for a simple, easily handled method and apparatus for the securing of symmetry when repairing structural or panel damages on cars.

SUMMARY OF THE INVENTION

The measuring possibility in accordance with the invention is achieved in a surprisingly simple way. In accordance with invention a measuring bar is used, extending horizontally and perpendicular to the length direction of the car. The bar is provided with fastening means, preferably at least two, for fastening the bar on the straightening frame or bench. On the outer ends of the bar there are arranged swivable or rotatable light beam emitting means, preferably lasers. These light emitting means emit light beams or rays in parallel planes that are both vertical and parallel with the length direction of the car when the bar is mounted perpendicular to the length direction of the car.

The bar is mounted fixedly in relation to the vehicle on the same straightening bench on which the car is fastened. The light beam (or in particular the laser beam) on the undamaged side of the vehicle can be directed so that it falls on a scale that is held against a measuring point. The reading on the scale is taken and used when adjusting or mounting corresponding parts on the damaged side of the vehicle. The laser beam on the damaged side impinges on the scale (that can be same scale as on the damaged side) held against a point on the damaged side that corresponds to the measurement point on the undamaged side.

As is apparent from the above the description of the method of the invention, it gives a great decrease in the work necessary for mounting devices for controlling the body symmetry. The device will also be simpler to use when repair work is carried out. This occurs since the laser beams emitted from the rotatable or turnable laser heads can be directed against any scale or rule held against a known position of a vehicle body. With the prior art technique it would be necessary to move the measuring frame repeatedly to secure that the measuring frame is located precisely outside of the desired measuring points. The measuring method according to the invention makes use of the fact that in order to secure symmetry it is sufficient to indicate only the widths positions or distances from the center plane of the vehicle. Normally it is not necessary to make any measurements lengthwise or heightwise of the car. The reason for this is that the height and the length positions or coordinates in general will be quite sufficiently defined by the panel parts that are mounted on the car or are to be mounted on it. In other words measuring normally takes place against specific points along the contour of the panel part. To check length and height measurements for instance, for a door opening or the like a simple means such as a rule or scale in one form or the other will be quite sufficient.

In a further development of the invented method the light beam sources or lasers are axially displacable in the ends of the bar for the adaptation to different vehicles widths. Alternatively the widths of the bar or the distance between the light beam sources can be adjusted so that the measurements achieved when measuring from the light beams against the vehicle coincide with measuring given in data sheets for the vehicle provided by the manufacturer. Preferably the extendible means for the laser heads includes a scale.

By using lasers it is possible to use the device at full lighting. In order to enable the adaptation of the extendible scales for different vehicles additional scale indicators can be used. This may in particular be the case if one can not guarantee an exactly centered mounting of the bar. It should also be mentioned that a correct centering of the bar can be checked by measuring or directing the laser beams so that readings can be taken against undamaged parts on both sides of the vehicle. It is possible to use the laser beams also to check that the bar really is perpendicular to the vehicle length axis by measuring relative known points lengthwise of the vehicle. By providing lines in the ceiling above the car perpendicular to the cars length direction it is possible further to facilitate coordination of the laser beams on the two sides of the vehicle. By providing also a few lines lengthwise of the vehicle it is also easy to check or adjust the cars position.

The invention is in particular intended for the use together with straightening benches existing on the market. No mounting or demounting of any measuring device is necessary between measuring and straightening and in fact the measuring can be continued concurrent with the straightening so that the straightening can be carried out directly to the final measure. In order to facilitate this for instance a rule provided with a magnet can be mounted on the part that is to be straightened, alternatively the mechanic may with one hand direct the laser beams against the rule that he holds with the other hand. He can then control the straightening work with the first hand until the intended measure has been reached. This procedure will be simple, comfortable and exact even when a certain return springing exists after the removal of the straightening forces.

The device, when used use for the symmetrical measurements according to the invention, may for instance further comprise locking means for the locking of the laser heads. If desired, there may be a coupling together of the swiveling movements of the laser heads or a coupling together of the extension of the laser heads so that they always extend the same distance from the bar itself.

Additional features and characteristics of the invention as well as possible developments of this are apparent from the following description of a preferred embodiment of the invention shown on the drawing and from the patent claims.

BRIEF DESCRIPTION OF THE DRAWINGS

In FIG. 1 there is shown how an instrument according to the invention is used adjacent a vehicle that is to be measured in accordance with the invention.

DESCRIPTION OF A PREFERRED EMBODIMENT

Figure 1:
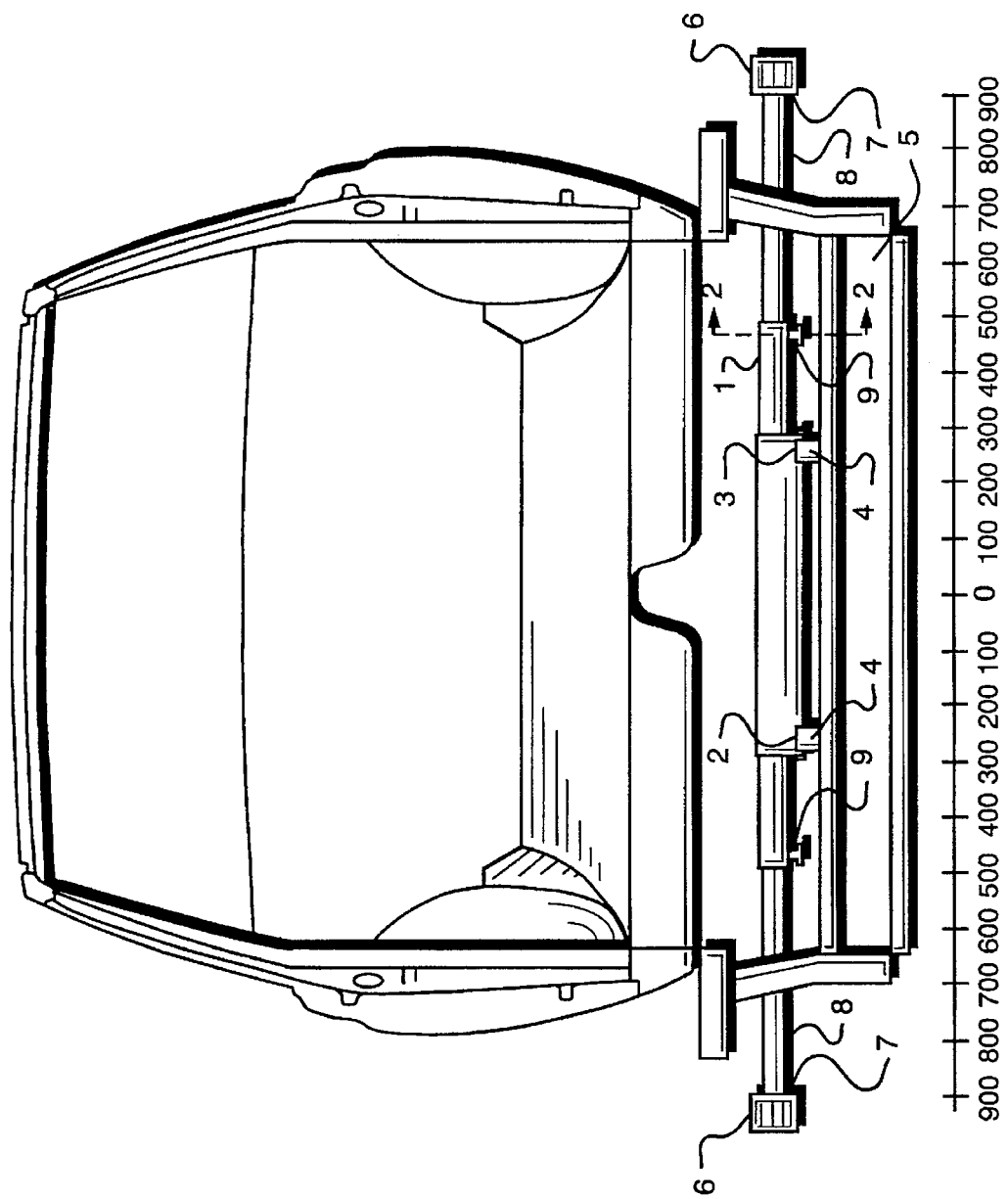
FIG. 1 is a schematic diagrammatic partially sectional view of one preferred from of the invention.

In FIG. 1 the symmetrical measurement device according to the invention includes a bar 1 having two brackets 2 and 3 by which it is held to a measuring frame 4. The measuring frame 4 is, in turn, is fastened to a straightening bench 5. On the outer ends of the bar laser heads 6 are arranged. These heads 6 comprise a laser diode, a battery, a switch and a bearing. The lasers heads 6 are very carefully adjusted so that they emit beams exactly perpendicular to the symmetry axis of the bar. The laser heads 6 are turnable i.e., in the direction of arrow B in the bearing 7 on the bar extensions 8. Each bar extension 8 is arranged to be adjustable on the bar 1 and lockable relative thereto by means of a screw 9. On the upper side of the bar extension a measuring scale is arranged. The symmetry axis of the turning axis of the laser head is in parallel with the length axis of the bar and the direction of the laser beam is perpendicular to this direction.

Figure 2:
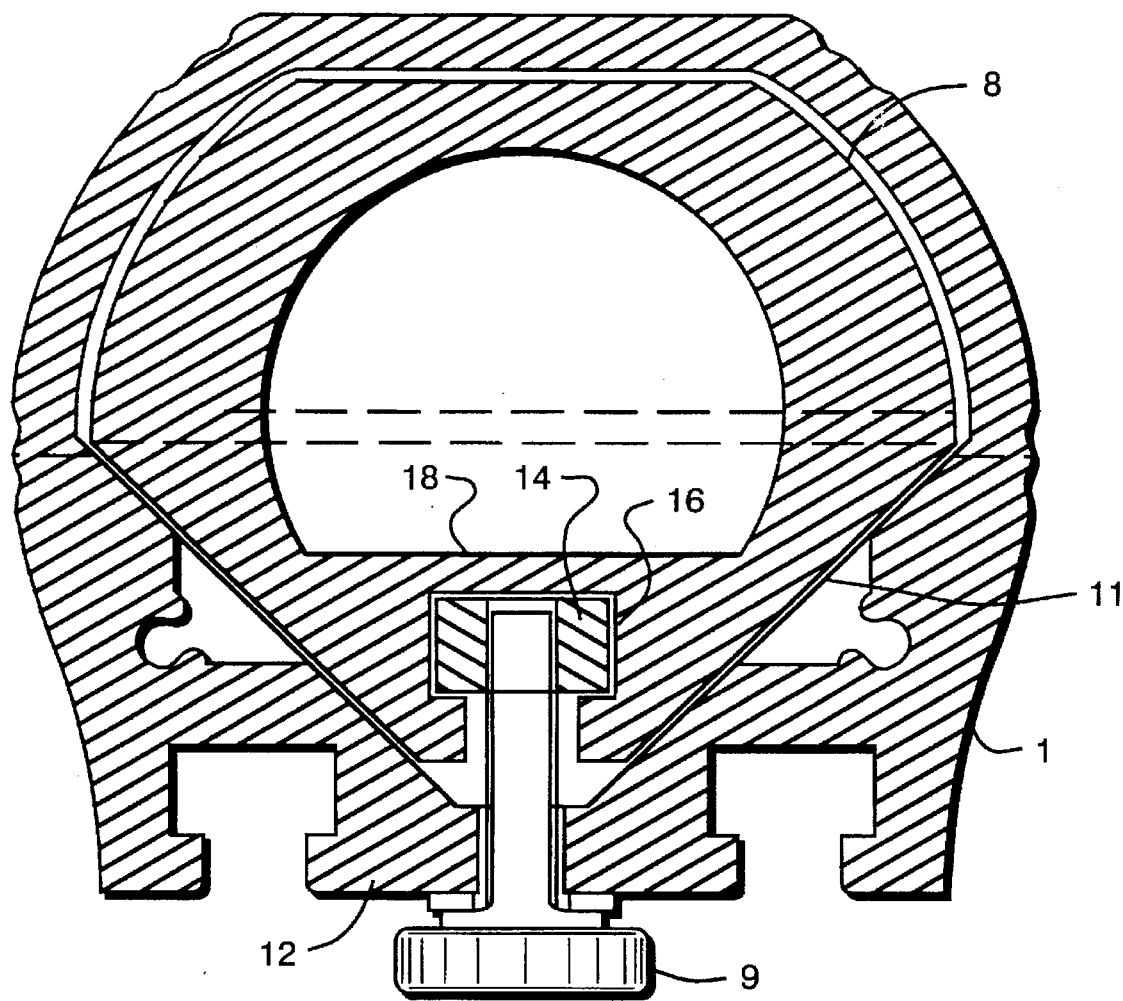
FIG. 2 is an enlarged partial sectional view taken along line 2—2 of FIG. 1.

As shown in more detail in FIG. 2, the extensions 8 on their lower side are V-shaped as shown at 11 and slidable in a likewise V-shaped profile 12 on the inside of the bar 1. (See FIG. 2) Furthermore in the inner ends of the extensions a or slide shoe 14 is arranged on the top of the extensions pressing the extensions down against the V-shaped guide in the bar 1. At the very bottom of each extension, in the apex of the V-shape of the extension, on undercut slit or recess 16 is arranged so that an essentially rectangular channel is obtained. In this channel a shoe 14 is arranged, provided with a threaded hole 18 in which the locking screw 9 is threaded. This means that when the screw is tightened the extension is pressed down in its outer end against the V-shaped guide in the bar. The sliding shoe 14 in the inner end and the locking screw 9 together will assure that the extension will be parallel with the bar even if their profiles are extruded in aluminum and therefore, in themselves, may be slightly distorted.

On the straightening bench a car 10 is mounted. When measuring, the laser beam is activated and the laser head 6 is turned so that the laser beam is directed towards the rule, scale or pocket rule held against an intended measuring point on the car body. The user holds the rule with one hand and directs the laser beam with the other one. In order to find the position of the rule that is parallel with the measuring bar the rule can, for instance, be tilted slightly here and there until the lowest reading is obtained corresponding to parallel conditions. The mechanic then goes to the other side of the car and measures there and will either receive an indication that a correct position has been obtained or can easily see how much correction that is still needed. If it is practical one can, of course, note the measurements on the undamaged side at a number of points to save walking time between the right and the left side. The precision obtained in this remarkably simple way is far greater than that existing between left and right sides of the cars when fabricated and is therefor more than enough for repair purposes.

Along with the good precision with the invented method and device, the possibility of mounting the symmetrical measuring device comparatively close to the measuring location, contributes to the fact that possible misalignments will be of little importance.

We claim:

1. Method for the measuring and checking the symmetry of vehicle bodies, characterized in that the vehicle is fastened on a straightening bench, a bar provided with turnable light beam emitting means on its ends is mounted on the straightening bench, with the bar extending horizontally and perpendicularly to the length direction of the vehicle, which light emitting means being arranged to emit two light beams that fall in parallel vertical planes that are perpendicular to the length axis of the bar and parallel with the length axis of the vehicle, the light emitting means giving vertical measurement planes on both sides of the vehicle, measuring from each plane the distance to any desired point on the vehicle body using a simple rule or scale held on the desired point with the scale held perpendicular to the measuring plane, rotating the light emitting means on a first side of the vehicle so that the light beam falls on the scale, rotating the light emitting beam on the second side of the vehicle to make a corresponding measurement on a scale positioned on a corresponding spot on the second side of the vehicle, and comparing the measurements on both side to assure symmetry of the vehicle body.

2. Method according to claim 1 characterized in that the lateral positions of the lasers are so adjusted laterally and the scales so marked that the readings obtained on the scales corresponds to data figures given for the vehicle by the maker.

* * * * *